US010585687B2

United States Patent
Daly et al.

(10) Patent No.: US 10,585,687 B2
(45) Date of Patent: Mar. 10, 2020

(54) RECOMMENDATIONS WITH CONSEQUENCES EXPLORATION

(71) Applicant: International Business Machines Corporation, Armonk, NY (US)

(72) Inventors: Elizabeth Daly, Monkstown (IE); Oznur Alkan, Clonsilla (IE)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 15/786,072

(22) Filed: Oct. 17, 2017

(65) Prior Publication Data
US 2019/0114180 A1    Apr. 18, 2019

(51) Int. Cl.
| | |
|---|---|
| G06Q 30/02 | (2012.01) |
| G06F 17/30 | (2006.01) |
| G06F 3/0482 | (2013.01) |
| G06F 9/451 | (2018.01) |
| G06F 16/9535 | (2019.01) |

(52) U.S. Cl.
CPC .......... *G06F 9/453* (2018.02); *G06F 3/0482* (2013.01); *G06F 16/9535* (2019.01); *G06Q 30/02* (2013.01); *Y10S 707/966* (2013.01)

(58) Field of Classification Search
CPC ... G06F 3/0482; G06F 16/9535; G06Q 50/01; G06Q 10/10
See application file for complete search history.

(56) References Cited

U.S. PATENT DOCUMENTS

| | | | |
|---|---|---|---|
| 5,870,768 A * | 2/1999 | Hekmatpour | G06F 3/0481 715/207 |
| 7,885,820 B1 | 2/2011 | Mancisidor et al. | |
| 8,386,457 B2 * | 2/2013 | McCloskey | G06Q 30/02 707/706 |
| 8,463,295 B1 | 6/2013 | Caralis et al. | |
| 8,566,261 B2 | 10/2013 | Mital et al. | |
| 9,076,179 B2 | 7/2015 | Xavier et al. | |
| 9,754,025 B2 * | 9/2017 | Roswell | G06F 16/683 |
| 9,818,162 B2 * | 11/2017 | Savage | G06Q 50/01 |

(Continued)

OTHER PUBLICATIONS

Anonymous, "System and method for assessing consumer interaction via pattern detection and prediction in social networks", An IP.com Prior Art Database Technical Disclosure, Aug. 22, 2016, 5 pages.

(Continued)

*Primary Examiner* — Jordany Nunez
(74) *Attorney, Agent, or Firm* — Scully, Scott, Murphy & Presser, P.C.; Kurt Goudy, Esq.

(57) ABSTRACT

Disclosed are ways to generate and present recommendations which provide a user with the ability to explore the follow-on consequences of accepting the recommendations. In some aspects, a method includes receiving a first user input including a recommendation topic, presenting, via a display, an exploration structure including a node corresponding to the recommendation topic, receiving data corresponding to the node from a knowledge repository, analyzing the received data to determine at least one follow-on recommendation based on the node, and presenting each determined follow-on recommendation in the exploration structure as a child node of the node corresponding to the recommendation topic.

17 Claims, 5 Drawing Sheets

(56) References Cited

U.S. PATENT DOCUMENTS

| | | | | |
|---|---|---|---|---|
| 2002/0152222 | A1* | 10/2002 | Holbrook | G06Q 40/04 |
| 2008/0168377 | A1* | 7/2008 | Stallings | H04L 12/4625 |
| | | | | 715/772 |
| 2009/0158192 | A1* | 6/2009 | De Peuter | G06F 3/0482 |
| | | | | 715/776 |
| 2010/0161400 | A1* | 6/2010 | Snodgrass | G06Q 30/02 |
| | | | | 705/14.16 |
| 2016/0148299 | A1 | 5/2016 | Caralis et al. | |
| 2016/0225063 | A1 | 8/2016 | Wical | |
| 2016/0328406 | A1* | 11/2016 | Convertino | G06F 3/04842 |

OTHER PUBLICATIONS

Anonymous, "A mechanism to recommend alternative URL with social relationship", An IP.com Prior Art Database Technical Disclosure, Jun. 24, 2015, 9 pages.

Anonymous, "Social events recommendation ranking mechanism", An IP.com Prior Art Database Technical Disclosure, Nov. 30, 2015, 4 pages.

Hagen, S.T., et al., "Exploration/Exploitation in Adaptive Recommender Systems", In proceedings of EUNITE, Jul. 10-12, 2003, 8 pages.

Cremonesi, P., et al., "Decision-Making in Recommender Systems: The Role of User's Goals and Bounded Resources", Presented at the 2012 Decisions@ RecSys Workshop, Sep. 2012, 7 pages.

Hariri, N., et al., "Adapting to User Preference Changes in Interactive Recommendation", Proceedings of the 24th International Conference on Artificial Intelligence (IJCAI'15), Jul. 25-31, 2015, pp. 4268-4274.

Jannach, D., et al., "User Control in Recommender Systems: Overview and Interaction Challenges", 17th International Joint Conference on Electronic Commerce and Web Technologies, First Online Feb. 15, 2017, 12 pages.

* cited by examiner

RECOMMENDATIONS WITH CONSEQUENCES EXPLORATION

BACKGROUND

The present disclosure relates to improvements in the systems and method used to recommend a course of action to a user.

Recommender systems and algorithms such as, e.g., collaborative filtering and content based recommenders are widely used in many domains including the recommendation of books and movies, courses of study, jobs to apply for, skills to learn, fitness activities, etc.

Often recommendations output by a recommender system are generally shown to a user with little explanation or motivation for why the action is recommended for that specific user.

Some example attempts to improve on this lack of information include providing an explanation or indication for why a user may want to take a certain action. For example, the recommendation may include a comparison of the action to a similar action previously taken by a user, such as recommending a movie because the user previously watched another similar movie. As the information available to a user increases, such explanations have become an increasingly important way for the user to accept and understand the recommendation.

BRIEF SUMMARY

In an aspect of the present disclosure, a method for generating and presenting recommendations including exploration of consequences is disclosed. The method includes receiving a first user input including a recommendation topic, presenting, via a display, an exploration structure including a node corresponding to the recommendation topic, receiving data corresponding to the node from a knowledge repository, analyzing the received data to determine at least one follow-on recommendation based on the node, and presenting each determined follow-on recommendation in the exploration structure as a child node of the node corresponding to the recommendation topic.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

While a user may be provided with a basic explanation for why a particular action is recommended, e.g., this movie is similar to another movie that the user has previously watched, the user is not shown the possibilities and follow up effects that their choice may have. For example, while a user may choose a recommended action based on a similarity to an action previously taken by the user, the user may not know what a potential outcome of taking the action will be.

Disclosed herein is are systems, methods, and computer program products that allow a user to make more informed choices by providing the user with the capability to explore a potential and predicted consequence of acting on a recommendation.

Figure 1:
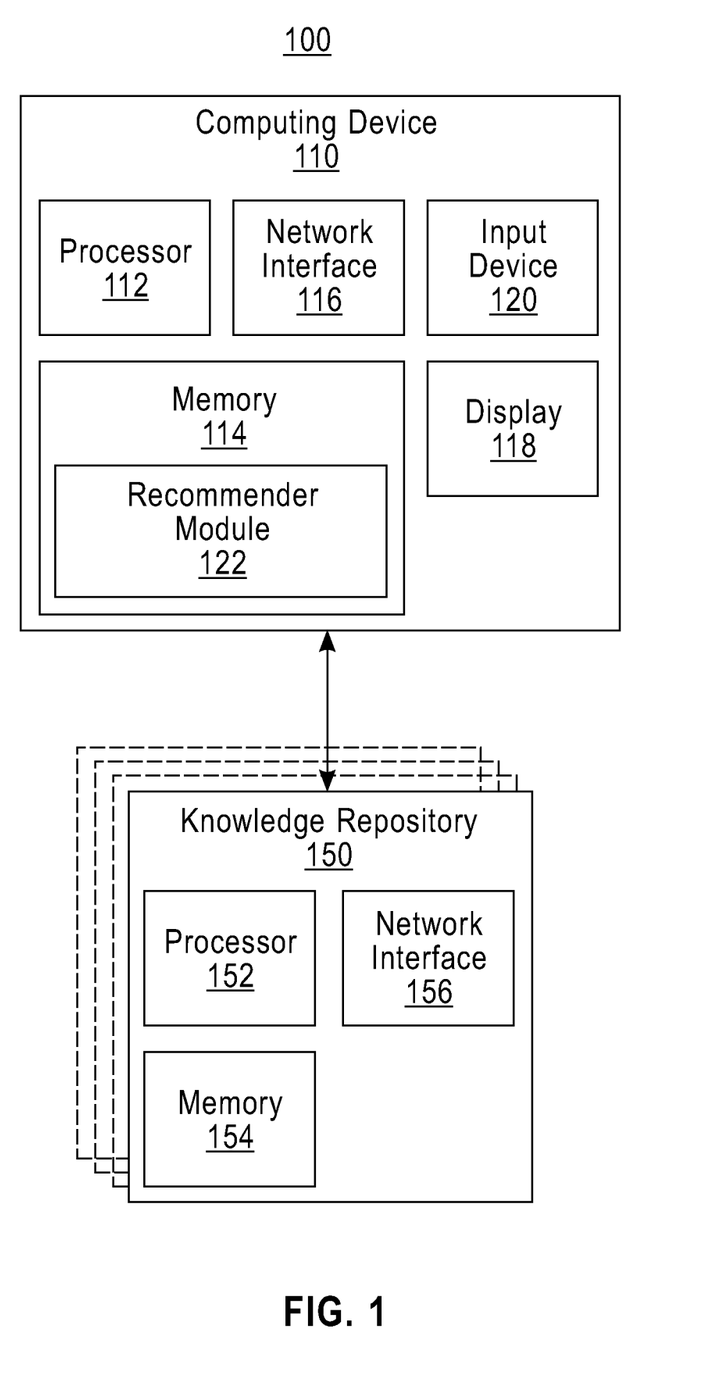
FIG. 1 is a system diagram illustrating a system in accordance with some aspects of the present disclosure.

With reference now to FIG. 1, a system 100 for providing recommendations to a user including the capability to explore potential and predicted consequence of the recommendations is illustrated. In some aspects, system 100 includes a computing device 110 and a knowledge repository 150.

Computing device 110 includes at least one processor 112, memory 114, at least one network interface 116, a display 118, an input device 120, and may include any other features commonly found in a computing device. In some aspects, computing device 110 may, for example, be a computing device associated with a user that is configured to present the user with one or more recommendations. In some aspects, computing device 110 may include, for example, a personal computer, laptop, tablet, smart device, smart phone, smart watch, or any other similar computing device that may be used by a user.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from a knowledge repository 150 or any other computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from knowledge repository 150.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Knowledge repository 150 includes a processor 152, memory 154, and a network interface 156 that may include similar functionality as processor 112, memory 114, and network interface 116. In some aspects, knowledge repository 150 may, for example, be any computing device, server, database or similar system that is configured to interact with or provide data to computing device 110. In some aspects, for example, knowledge repository 150 may store data or information on actions, items, or other information associated with a recommendation topic. In some aspects knowledge repository 150 may include more than one knowledge repository where, for example, each topic, field, etc., may have its own corresponding knowledge repository 150 of information. In some aspects, one or more of knowledge repositories 150 may be located remote from computing device 110.

With continued reference to FIG. 1, computing device 110 may include a recommender module 122 that takes user preferences, choices or criteria as an input and finds best matches with actions in a knowledge repository, e.g., knowledge repository 150. For example, computing device 110 may receive an input, e.g., via input device 120, from a user that specifies or identifies a particular topic, field, or other area of interest for which the user is requesting a recommendation. In some aspects, for example, the received input may specify one or more actions that may be taken by the user. While described with reference to actions that a user may take, any other recommendation may also be made by recommender module 122. In some aspects, for example, recommender module 122 may provide a recommendation based on a context of the user even if the user does not specifically request a recommendation.

In response to receiving an input from the user specifying a particular topic, field, or other area of interest, recommender module 122 may access the knowledge repository 150 for data or information related to that topic, field, etc. For example, if the topic is a particular educational path, e.g., science, biology, etc., computing device 110 may be configured to obtain information on courses in that educational path, potential job opportunities for graduates of that educational path, or other similar information from one or more knowledge repositories 150. For example, computing device 110 may perform a search operation to identify one or more knowledge repositories 150 that may contain the information associated with the educational path. Recommender module 122 may analyze the received data or information and may determine recommendations for potential follow-on actions or effects, for example, using common recommendation techniques such as, e.g., a traditional content based system or a collaborative filtering solution. In some aspects, for example, recommender module 122 may perform collaborative filtering, content-based filtering, or hybrid approaches.

In some aspects, user information may be stored as user preferences or profile and may include data regarding demographic information, job details, contextual data, location data, or other similar data that may be utilized by recommender module 122 when generating recommendations.

Figure 3:
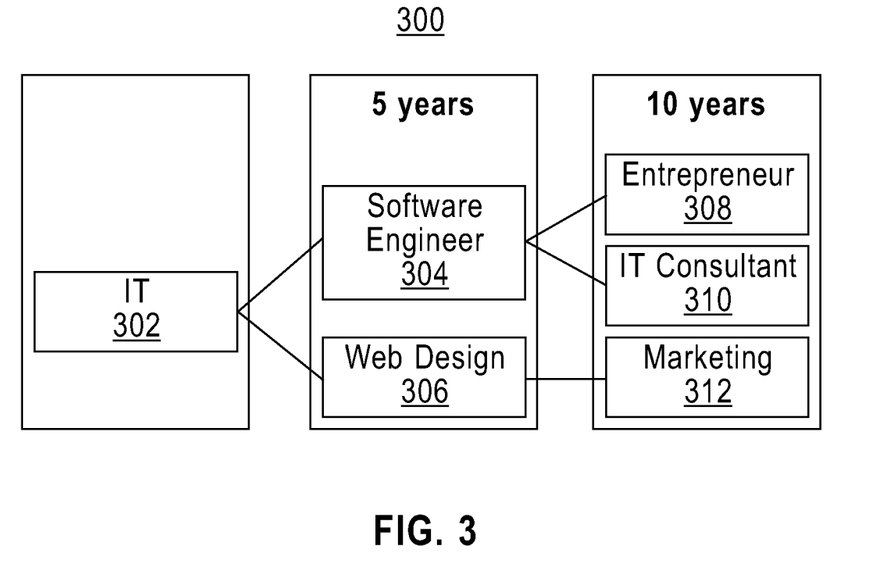
FIG. 3 is a diagram illustrating another example exploration structure generated in accordance with some aspects of the present disclosure.
Figure 4:
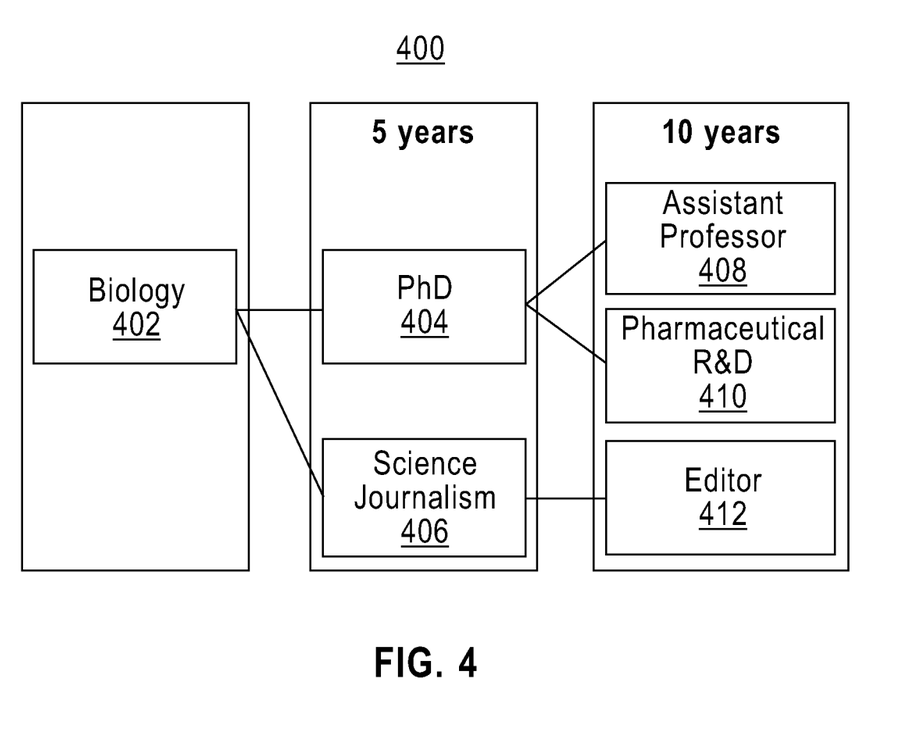
FIG. 4 is a diagram illustrating yet another example exploration structure generated in accordance with some aspects of the present disclosure.

In some aspects, information from the user profile may be used to filter recommendation items. For example, considering course recommendations, if a user requests recommendations for a specific time duration, and has a specific budget, only the relevant course items that conform to these user preferences may be displayed as recommendations. For example, each recommended follow-on action or effect may include a time component, e.g., 5 years, 10 years, etc., as illustrated in FIGS. 3 and 4. An effect may include, for example, an expected result of performing an action. The recommender module may compare the time component of each follow-on action to the user's specified time duration to determine whether the recommended follow-on action or effect should be presented in the exploration structure.

In some aspects, the follow-on action or effect may be an impact of accepting a recommendation. For example, if a user wishes to know an impact of accepting a recommendation to listen to a song of a particular artist, recommender module 122 may generate follow-on effects for that action, e.g., additional songs from that artist or similar artists may be recommended to the user as a follow-on effect of the user accepting the recommendation to listen to that particular song.

In some aspects, previous interactions and history of the user may be obtained, analyzed, and compared to other users to determine a set of similar users. For example, information about the user that is entered by the user into computing device 110 or tracked and stored in one or more knowledge repositories 150 may be accessed and analyzed to determine similar users. Such information may include, for example, previous choices in a historical sense (users score new items, like they rate songs, etc), user preferences, or other similar information. In some aspects, user preferences may be taken externally and may be integrated into the recommender module. Using this information, similar users may be found, for example, by matching which of the items the similar users score same as the user. One example approach may be to use a k-nearest neighbor algorithm based on the items that the user has scored so far. The set of similar users may then be utilized to generate recommendations by analyzing what actions those similar users have taken as compared to the actions that the current user has taken. For example, if the similar users have taken a particular action and the user has not, the user may be recommended to take that action.

Figure 2:
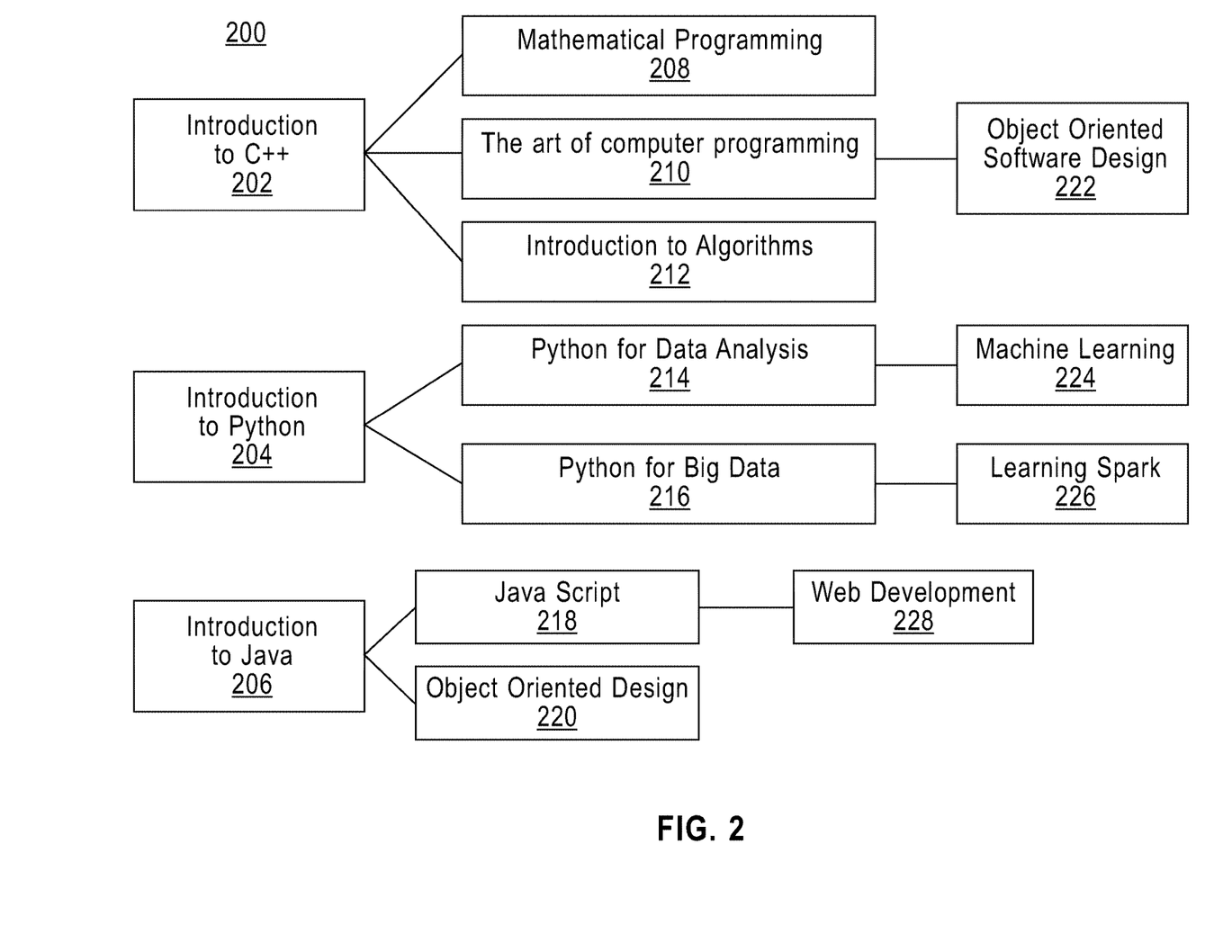
FIG. 2 is a diagram illustrating an example exploration structure generated in accordance with some aspects of the present disclosure.

In some aspects, for example, recommender module 122 may generate an exploration structure of recommendations that includes potential follow-on actions or effects, for example, as illustrated in FIGS. 2-4. In some aspects, for example, the exploration structure may take the form of a tree.

In some aspects, for example, the generated exploration structure may be presented to a user of computing device 110, e.g., via display 118. In some aspects, for example, recommender module 122 may generate an initial set of nodes in the exploration structure corresponding to recommended actions based on the input received from the user, e.g., as illustrated by nodes 202, 204, and 206 of FIG. 2. In some aspects, recommender module 122 may generate follow-on recommended actions or effects for each of the initial set of recommended actions as child nodes of the initial set of recommended actions, e.g., as illustrated by nodes 208-220 of FIG. 2.

In some aspects, the follow-on recommended actions may be automatically generated for each of nodes 202, 204, and 206 and presented via display 118 to the user. In some aspects, the follow-on recommended actions may alternatively be generated only when one of nodes 202, 204, and 206 is activated by the user, e.g., via input device 120. For example, the initial actions, e.g., actions for nodes 202-206, may be initially presented to the user via display 118 without presenting any nodes for follow-on actions or effects. Once one of the initial action nodes, e.g., node 202, is activated by a user input, follow-on actions or effects may be generated by recommender module 122 and presented to the user via display 118 as nodes, e.g., nodes 208-212. In some aspects, the nodes for the follow-on actions or effects may alternatively be displayed in a semi-transparent, faded, or grayed out manner until one of the initial action nodes is activated by the user.

In some aspects, recommender module 122 may be executed each time one of the nodes of the exploration structure is activated by a user. For example, the user may wish to traverse each available path in the tree to see what the potential effect of choosing one of the initial actions may be in the future.

With reference again to FIG. 2, an example exploration structure scenario is now described. In the example scenario, a user is deciding between three recommended courses for learning a programming language: Introduction to C++, Introduction to Python, and Introduction to Java. The user is making a decision based on local knowledge without the understanding of what kinds of opportunities and implications the different decisions might have. On the surface the user appears to be simply choosing between three programming languages. The user may be unaware, however, of the impact that choosing a particular language may have on what kind of computer science field or future employment that they may be qualified for. For example, C++ is a preferred programming language for mathematical programming fields, Python is a popular programming language in the machine learning and big data analysis fields, and Java is a popular programming language in the web development field.

The disclosed system 100 generates an exploration structure for the user with indications where taking an action now may lead them in the future based on frequently seen course progressions, learning paths, and career opportunities. For example, instead of presenting the user with a flat recommendation as a ranked list, e.g., a recommendation simply indicating that C++ has a highest score, followed by Java, and finally Python (or any other order), the exploration structure generated by system 100 allows the user to explore their potential choices and the effect that each potential choices will have on their next recommendations or future goals by presenting the user with an exploration structure 200 as illustrated, for example, in FIG. 2. In some aspects, for example, the exploration structure may be generated using a tree-based graphical user interface. When a parent node is activated or selected by a user, a request may be sent, e.g., to the recommender module, requesting follow-on actions to an action of the parent node which may then be used to populate child nodes of that parent node.

For example, as described above, the user may input a topic or criteria using input device 120. For example, the user may input the available programming courses, e.g., Introduction to C++, Introduction to Python, and Introduction to Java, into computing device 100 as an input. Each of these inputs may be presented to the user as part of exploration structure 200, e.g., as nodes 202, 204, and 206. When computing device 110 receives the input, or when the user activates one of nodes 202, 204, and 206 for further consideration, computing device 110 may request additional information from one or more knowledge repositories 150 regarding the user's inputs.

As an example, a knowledge repository 150 associated with an educational institution that is providing the courses may be accessed by computing device 110. The knowledge repository 150 associated with the educational institution may provide data or information about available courses to the computing device 110. In some aspects, the knowledge repository 150 associated with the educational institution may provide data or information about what courses other students have taken. For example, if another student has taken Introduction to Java, e.g., node 206, knowledge repository 150 may provide information on other courses that the other student has also taken. In some aspects, computing device 110 may determine the most relevant course paths that other students have taken in conjunction with one of the courses of nodes 202-206. For example, if a majority of students who took Introduction to Java, e.g., node 206, also took Java Script and Object Oriented Design, this may indicate a positive correlation between the two courses and may be indicated by exploration structure 200, e.g., by nodes 218 and 220. In another example, if one student out of one-hundred took a particular course in conjunction with taking Introduction to Java, that particular course may be discounted by computing device 110 and may not be presented as an option in exploration structure 200. In an alternative aspect, for example, if that one particular course is positively correlated with the eventual employment of that student to a non-typical employment opportunity, e.g., an employment opportunity that a threshold number or percentage of students who took the course achieved, the alternative may be presented to the user in exploration structure 200 to provide the user more choices including that possibility of that non-typical employment opportunity.

In some aspects, for example, the information from knowledge repository 150 may also or alternatively include employment opportunities associated with each line of courses. For example, the educational institution may store employment data for each class of students that has graduated from the educational institution. The stored employment data may be analyzed to determine any correlations between courses taken and employment fields. For example, based on the analysis, a positive correlation may be determined between students who took Introduction to Java or one or more of the follow-on courses and received employment in web development. This employment data may then be utilized to present the user with an exploration structure presenting follow-on actions or effects such as future employment opportunities that may result from taking introduction to java, e.g., as node 228.

In some aspects, the entire exploration structure 200 may be generated and presented to the user via display 118. For example, for each node 202, 204, and 206 and the recommended follow-up actions or effects nodes 208-220 may be generated and presented. For each of the follow-up actions or effects 208-220, any additional follow-up actions or effects nodes, e.g., 222, 224, 226, and 228, may also be presented as child nodes, e.g., off of nodes 210, 214, 216, and 218, respectively.

In some aspects, recommender module 122 may generate all recommended actions and follow-up actions or effects in response to receiving the initial input from the user. In some aspects, each set of child nodes may only be generated by recommender module 122 after a parent node is activated by the user. For example, if the user wishes to know more about the follow-on actions or effects of node 202, Introduction to C++, the user may activate node 202, such as selecting the node using input device 120 or via display 118, and recommender module 122 may then generate follow-on actions or effects of the user performing node 202, i.e., taking the introduction to C++ class, and may present the follow-on actions or effects as nodes 208-212. If the user then wishes to know more about the follow-on actions or effects of performing node 210, i.e. taking "The art of computer programming", the user may activate node 210 and recommender module 122 may generate follow-on actions or effects of node 210, e.g., Object oriented software design, and may present the follow-on action or effect as a child node 222 off of node 210.

The presentation of these generated follow-on actions or effects allow the user to make an informed decision on which initial action to perform, e.g., taking Introduction to C++, Introduction to Python, or Introduction to Java, by providing the user with additional information on the future consequence of each available action.

In some aspects, the computing device 110 may also access one or more additional or alternative knowledge repositories 150 that may include future employment related data. For example, computing device 110 may access a social network and careers knowledge repository such as, e.g., LinkedIn®, to receive information of future potential employment based on a particular career path.

For example, with reference now to FIGS. 3 and 4, a resource such as LinkedIn® may be leveraged to determine the most frequently seen career paths in a particular field. For example, a user who has a choice between an IT career path (FIG. 3), and a Biology career path (FIG. 4) may wish to explore the potential employment opportunities in each career path. The user may input IT and biology using input device 120 and request more information. Computing device 110 may receive data or information on career paths from a knowledge repository 150, e.g., LinkedIn®, and may analyze the data to determine correlations between the input careers and potential future careers. Computing device 110 may present an exploration structure 300 including IT as a node 302, and an exploration structure 400 including Biology as a node 402. As mentioned above, in some aspects, only node 302 may be initially presented in exploration structure 300. Alternatively, the entire exploration structure 300 may be presented including follow-on actions or effects illustrated as nodes 302, 304, 306, 308, 310, and 312. Likewise, in some aspects, only node 402 may be initially presented in exploration structure 400. Alternatively, the entire exploration structure 400 may be presented including follow-on actions or effects illustrated as nodes 402, 404, 406, 408, 410, and 412.

In some aspects, for example, the user may be enabled to explore the consequences of a career choice over different time spans. For example, the user may specify that the user wishes to see career options for only the next 5 years, e.g. via input device 120. In response, recommender module 122 may present the user with exploration structure 300 including node 302 and nodes 304 and 306, which correspond to potential career opportunities that may be available within 5 years of experience.

In some aspects, similar to that described above with respect to exploration structure 200, computing device 110 may receive as an input a user selection from a recommended list of potential career paths and may recursively allow the user to explore the consequences of having accepted the recommendation, for example, by generating potential career opportunities and career paths by analyzing data received from one or more knowledge repositories 150. The recommendations may be generated recursively in the sense that as long as the user requests a recommendation by clicking on a node, the exploration structure continues to expand with new follow-on recommendations being generated accordingly. In some aspects, for example, recommender module 122 may determine that a threshold percentage of individuals who pursue a career in IT, e.g., node 302 as input by the user, become software engineers or web designers, these career opportunities may be presented to the user as nodes 304 and 306, respectively. Likewise, recommender module 122 may determine that a threshold percentage of individuals who pursue a career as a software engineer, e.g., node 304, become entrepreneurs or IT consultants, these career opportunities may be presented to the user as nodes 308 and 310, respectively, while recommender module 122 may determine that a threshold percentage of individuals who pursue a career as a web designer, e.g., node 306, go into marketing, this career opportunity may be presented to the user as a node 312.

Similar determinations may be made using the recommender system with respect to exploration structure 400, e.g., as illustrated in FIG. 4, where, for example, in response to user inputting biology as a potential career, recommender module 122 may present the user with exploration structure 400 including a node 402 for biology, potential careers of PhD and Science Journalism as nodes 404 and 406, respectively, and further potential careers of Assistant Professor, Pharmaceutical R&D, and Editor as nodes 408, 410, and 412, respectively.

In some aspects, data from multiple knowledge repositories 150 may be utilized to determine recommended follow-on actions or effects. For example, this may be achieved by combining the data on career paths of individuals with the courses they take within a certain time frame prior to entering into a career. In an example, the data received from knowledge repository 150 for an individual indicates that the individual joined company X at time $t_x$ and then moved to company Y at time $t_y$. The data further indicates that the individual took a set of courses between times $t_x$ and $t_y$. Recommender module 122 may determine based on this information that the set of courses taken between $t_x$ and $t_y$ may lead an individual to develop skills needed for the position that the individual is performing at company Y. This information may then be presented as part of the exploration structure where, for example, the exploration structure may present the individual's job at company X as a first node, the set of courses that the individual took as a second node, e.g., a child node off of the first node, and the job at company Y as a third node, e.g., a child node off of the second node. This shows the user that if the user is considering a position performing a job similar to the job at company X, the user may have the potential to move to a job similar to the job at company Y if the user performs the follow-on action of taking the set of courses.

As mentioned above, system 100 provides the user with a visual interface to enable the exploration of potential options or actions that may be taken by the user if the user pursues a particular path.

In some aspects, for example, the user may select one of the recommended options or paths, e.g., using input device 120, and may navigate along that path, e.g., by making further selections of nodes, to determine the impact of their selected option on future follow-on actions or effects. The navigation may include selecting a recommendation node or the user may select additional criteria such as an event occurring, e.g., 5 years of time have elapsed. For example, in the medical domain the consequences of a recommendation may be time dependent and the visualization may include a time line, e.g., as illustrated in FIGS. 3 and 4.

In some aspects, recommender module 122 may receive and take into account data or other information from knowledge repositories 150 including, e.g., user profile, history of interactions, and other contextual information such as a user's location or desired location. For example, location may have a bearing on what career opportunities may be available to the user after graduation, when the user decides to change jobs, or for any future career paths. For example, recommender module 122 may analyze the region where the user resides to determine whether a particular career opportunity is even a viable option, e.g., by analyzing the percentage of jobs of the particular type that are in the user's region. In this case, even though career path selected by the user may include a future career of, for example, Pharmaceutical R&D, node 410, if there are no pharmaceutical companies in the user's region and the user has indicated a desire to stay within that region, e.g., via input device 120, the node 410 for that career choice may not be presented to the user in the exploration structure 400.

Figure 5:
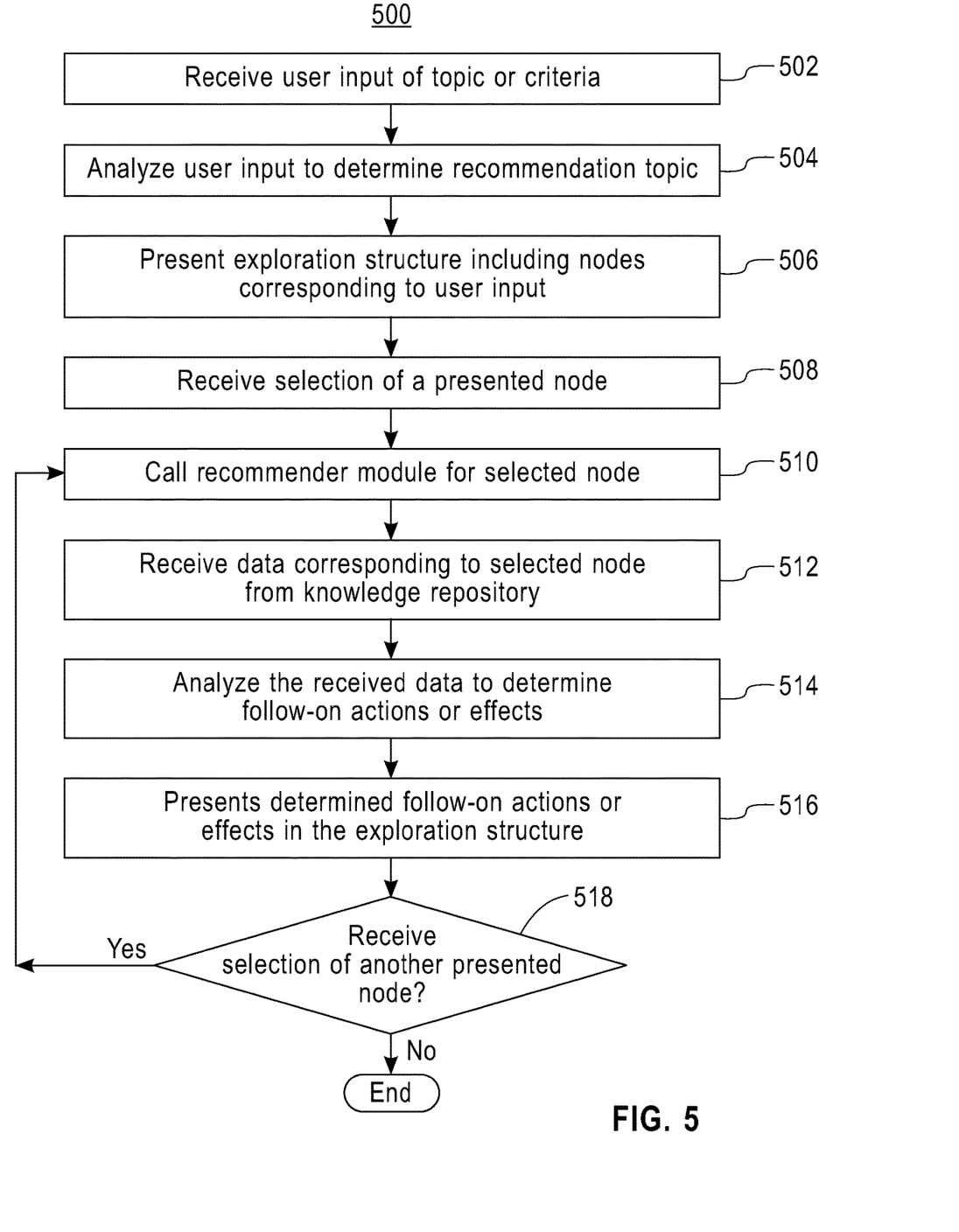
FIG. 5 is a flow chart of a method for generating and presenting recommendations in accordance with some aspects of the present disclosure.

With reference now to FIG. 5, a method 500 for generating an exploration structure is illustrated.

At 502, computing device 110 receives an input from the user, e.g., via input device 120, that identifies a topic or criteria that the user would like recommendations on. For example, in an educational domain the user may input potential course selects, a potential career field, or any other item of information that may be used as a basis for generating an exploration structure.

At 504, recommender module 122 is called to analyze the identified topics or criteria and at 506 recommender module 122 visually presents nodes associated with those topics or criteria to the user as recommendations via display 116, e.g., any of nodes 202 (FIG. 2), 204 (FIG. 2), 206 (FIG. 2), 302 (FIG. 3), and 402 (FIG. 4).

At 508, computing device 110 receives a selection of one of the presented nodes for further exploration by the user, e.g., via input device 120.

At 510, recommender module 122 is called to implement a recommendation algorithm that generates follow-on actions or effects for the selected node.

At 512, recommender module 122 receives data corresponding to the selected node from one or more knowledge repositories 150.

At 514, recommender module 122 invokes algorithms that analyze the received data to determine follow-on actions or effects for the selected node.

At 516, recommender module 122 presents the determined follow-on actions or effects to the user as additional nodes connected in the exploration structure as one or more child nodes off of the selected node.

At 518, computing device 110 determines whether another node is selected by the user. If another node is selected, the method returns to 510 and calls recommender module 122 for the selected node, 512-516 are performed for the selected node to present additional follow-on actions or effects in the exploration structure, and computing device 110 again determines whether another node is selected. If another node is not selected at 518, the method ends.

Figure 6:
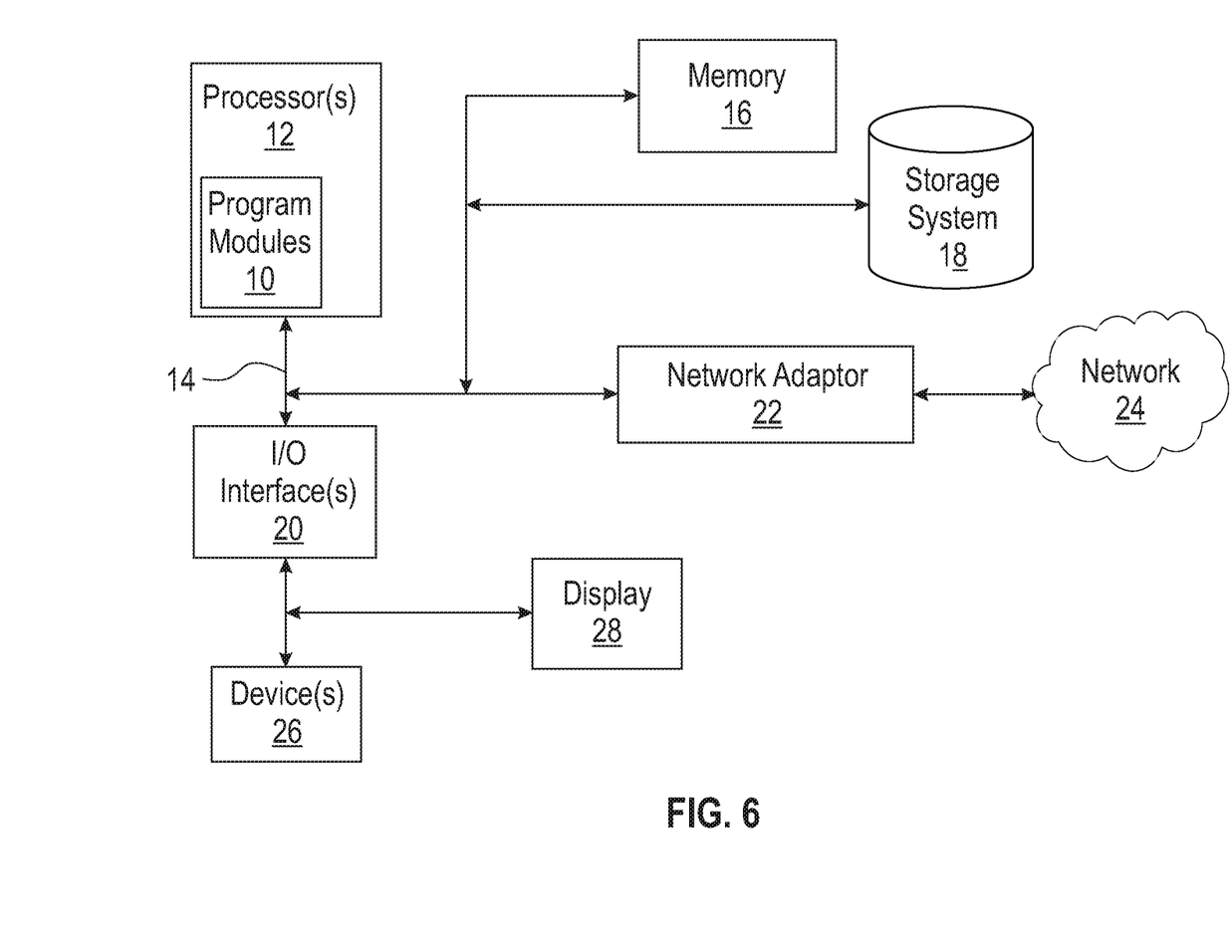
FIG. 6 is an exemplary block diagram of a computer system in which processes involved in the system, method, and computer program product described herein may be implemented.

FIG. 6 illustrates a schematic of an example computer or processing system that may implement any portion of system 100, computing device 110, knowledge repository 150, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one processor comprising hardware, the method comprising:
    receiving a user input including a recommendation topic;
    presenting, via a display interface, an exploration structure including a node corresponding to the recommendation topic;
    receiving data corresponding to the node from a knowledge repository;
    analyzing the received data to determine at least one follow-on recommendation based on the node, said follow-on recommendation being a follow-on action to be pursued by the user, said follow-on recommendation determined to be positively correlated to said node; and
    presenting, via the display interface, each determined follow-on action recommendation in the exploration structure as additional child nodes of the node corresponding to the recommendation topic; and
    receiving, via the display interface, user input selections of one or more said additional child nodes that traverse a path of potential recommended follow-on actions for determining a subsequent impact on the user based on the user pursuing the follow-on actions, said method further comprising:
    obtaining contextual information regarding the user and a history of prior user transactions;
    analyzing said contextual information and prior user interactions history;
    comparing said contextual information and history to other users to determine a set of similar users; and
    generating follow-on recommendations comprising follow-on actions the similar users have taken in view of the actions that the user has taken.

2. The method of claim 1, further comprising:
    receiving a further user input including a selection of the node, wherein the receiving of the data, analyzing the received data, and presenting each determined follow-on recommendation action in the exploration structure are performed in response to receiving the further user input.

3. The method of claim 1, further comprising:
    receiving a further user input including a selection of one of the child nodes; and
    in response to receiving the further user input:
        receiving data corresponding to the selected one of the child nodes from the knowledge repository;
        analyzing the received data corresponding to the selected one of the child nodes to determine at least one follow-on recommendation based on the selected one of the child nodes; and
        presenting each follow-on recommendation that is determined based on the selected one of the child nodes in the exploration structure as a child node of the selected one of the child nodes.

4. The method of claim 1, further comprising:
    receiving a further user input specifying a period of time;
    comparing the specified period of time to a time component associated with each of the determined follow-on recommendations; and
    determining that the time component of one or more of the determined follow-on recommendations meets the specified period of time,
    wherein presenting each determined follow-on recommendation in the exploration structure as a child node of the node corresponding to the recommendation topic comprises presenting only the one or more of the determined follow-on recommendations having time components that meet the specified period of time in the exploration structure.

5. The method of claim 1, further comprising:
    receiving a further user input specifying a location;
    comparing the specified location to a location component of each of the determined follow-on recommendations; and
    determining that the location component of one or more of the determined follow-on recommendations meets the specified location,
    wherein presenting each determined follow-on recommendation in the exploration structure as a child node of the node corresponding to the recommendation topic comprises presenting only the one or more of the determined follow-on recommendations having location components that meet the specified location in the exploration structure.

6. The method of claim 1, wherein analyzing the received data to determine at least one follow-on recommendation based on the node comprises analyzing at least one action taken by another individual as follow-on to taking an action based on the node.

7. A system comprising:
    a display; and
    at least one processor comprising hardware, the at least one processor configured to:

receive a first user input including a recommendation topic;

present, via a display, an exploration structure including a node corresponding to the recommendation topic;

receive data corresponding to the node from a knowledge repository;

analyze the received data to determine at least one follow-on recommendation based on the node, said follow-on recommendation being a follow-on action to be pursued by the first user, said follow-on recommendation determined to be positively correlated to said node; and present, via the display, each determined follow-on action recommendation in the exploration structure as additional child nodes of the node corresponding to the recommendation topic; and receive, via the display, user input selections of one or more said additional child nodes that traverse a path of potential recommended follow-on actions for determining a subsequent impact on the user based on the user pursuing the follow-on actions, wherein the at least one processor is further configured to:

obtain contextual information regarding the user and a history of prior user transactions;

analyze said contextual information and prior user interactions history;

compare said contextual information and history to other users to determine a set of similar users; and generate follow-on recommendations comprising follow-on actions the similar users have taken in view of the actions that the user has taken.

8. The system of claim 7, the at least one processor further configured to:

receive a second user input including a selection of the node, wherein the receiving of the data, analyzing the received data, and presenting each determined follow-on recommendation in the exploration structure are performed in response to receiving the second user input.

9. The system of claim 7, the at least one processor further configured to:

receive a second user input including a selection of one of the child nodes; and in response to receiving the second user input:

receive data corresponding to the selected one of the child nodes from the knowledge repository;

analyze the received data corresponding to the selected one of the child nodes to determine at least one follow-on recommendation based on the selected one of the child nodes; and present each follow-on recommendation that is determined based on the selected one of the child nodes in the exploration structure as a child node of the selected one of the child nodes.

10. The system of claim 7, the at least one processor further configured to:

receive a second user input specifying a period of time;

compare the specified period of time to a time component of each of the determined follow-on recommendations; and determine that the time component of one or more of the determined follow-on recommendations meets the specified period of time, wherein only the one or more of the determined follow-on recommendations having time components that meet the specified period of time are presented in the exploration structure.

11. The system of claim 7, the at least one processor further configured to:

receive a second user input specifying a location;

compare the specified location to a location component of each of the determined follow-on recommendations; and determine that the location component of one or more of the determined follow-on recommendations meets the specified location, wherein only the one or more of the determined follow-on recommendations having location components that meet the specified location are presented in the exploration structure.

12. The system of claim 7, wherein analyzing the received data to determine at least one follow-on recommendation based on the node comprises analyzing at least one action taken by another individual as follow-on to taking an action based on the node.

13. A computer readable medium comprising instructions that, when executed by at least one processor comprising hardware, configure the at least one hardware processor to:

receive a first user input including a recommendation topic;

present, via a display, an exploration structure including a node corresponding to the recommendation topic;

receive data corresponding to the node from a knowledge repository;

analyze the received data to determine at least one follow-on recommendation based on the node, said follow-on recommendation being a follow-on action to be pursued by the user, said follow-on recommendation determined to be positively correlated to said node; and present, via the display, each determined follow-on action recommendation in the exploration structure as additional child nodes of the node corresponding to the recommendation topic; and receive, via the display, user input selections of one or more said additional child nodes that traverse a path of potential recommended follow-on actions for determining a subsequent impact on the user based on the user pursuing the follow-on actions, wherein the instructions further configuring the at least one processor to:

obtain contextual information regarding the user and a history of prior user transactions;

analyze said contextual information and prior user interactions history;

compare said contextual information and history to other users to determine a set of similar users; and generate follow-on recommendations comprising follow-on actions the similar users have taken in view of the actions that the user has taken.

14. The computer readable medium of claim 13, the instructions further configuring the at least one processor to:

receive a second user input including a selection of the node, wherein the receiving of the data, analyzing the received data, and presenting each determined follow-on recommendation in the exploration structure are performed in response to receiving the second user input.

15. The computer readable medium of claim 13, the instructions further configuring the at least one processor to:

receive a second user input including a selection of one of the child nodes; and in response to receiving the second user input:
  receive data corresponding to the selected one of the child nodes from the knowledge repository;
  analyze the received data corresponding to the selected one of the child nodes to determine at least one follow-on recommendation based on the selected one of the child nodes; and
  present each follow-on recommendation that is determined based on the selected one of the child nodes in the exploration structure as a child node of the selected one of the child nodes.

16. The computer readable medium of claim 13, the at least one processor further configured to:
  receive a second user input specifying a period of time;
  compare the specified period of time to a time component of each of the determined follow-on recommendations; and
  determine that the time component of one or more of the determined follow-on recommendations meets the specified period of time,
  wherein only the one or more of the determined follow-on recommendations having time components that meet the specified period of time are presented in the exploration structure.

17. The computer readable medium of claim 13, the at least one processor further configured to:
  receive a second user input specifying a location;
  compare the specified location to a location component of each of the determined follow-on recommendations; and
  determine that the location component of one or more of the determined follow-on recommendations meets the specified location,
  wherein only the one or more of the determined follow-on recommendations having location components that meet the specified location are presented in the exploration structure.

* * * * *